(12) United States Patent
Atienza et al.

(10) Patent No.: US 10,734,660 B2
(45) Date of Patent: Aug. 4, 2020

(54) FUNCTIONALIZED CARBON LAYER FOR MEMBRANE DEGRADATION MITIGATION UNDER FUEL CELL OPERATING CONDITIONS

(71) Applicant: Nissan North America, Inc., Franklin, TN (US)

(72) Inventors: Dianne Atienza, Farmington Hills, MI (US); Nilesh Dale, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 212 days.

(21) Appl. No.: 15/066,574

(22) Filed: Mar. 10, 2016

(65) Prior Publication Data
US 2017/0263948 A1  Sep. 14, 2017

(51) Int. Cl.
*H01M 8/028* (2016.01)
*H01M 8/1004* (2016.01)
(Continued)

(52) U.S. Cl.
CPC ......... *H01M 8/028* (2013.01); *H01M 4/8605* (2013.01); *H01M 4/9041* (2013.01); *H01M 8/1004* (2013.01); *H01M 8/1018* (2013.01); *H01M 2004/8684* (2013.01); *H01M 2008/1095* (2013.01)

(58) Field of Classification Search
None
See application file for complete search history.

(56) References Cited

U.S. PATENT DOCUMENTS 4,332,665 A  6/1982 Kimoto et al.
4,337,137 A  6/1982 Ezzell
(Continued)

FOREIGN PATENT DOCUMENTS

JP  S5792029 A  6/1982
JP  S6376265 A  4/1988
(Continued)

OTHER PUBLICATIONS

Wang et. al; "Noncarbon Support Materials for Polymer Electrolyte Membrane Fuel Cell Electrocatalysts"; Aug. 16, 2011 (Year: 2011).*

*Primary Examiner* — Barbara L Gilliam
*Assistant Examiner* — Nathanael T Zemui
(74) *Attorney, Agent, or Firm* — Young Basile Hanlon & MacFarlane, P.C.

(57) ABSTRACT

A membrane electrode assembly for a fuel cell comprises a proton exchange membrane having an anode side and a cathode side. An anode catalyst layer is on the anode side of the proton exchange membrane and a cathode catalyst layer is on the cathode side of the proton exchange membrane. Each of the anode catalyst layer and the cathode catalyst layer comprises a metal alloy. A gas diffusion layer is on each of the anode catalyst layer and the cathode catalyst layer opposite the proton exchange membrane. A sacrificial intercalating agent is between the proton exchange membrane and one of the anode catalyst layer and the cathode catalyst layer, the sacrificial intercalating agent having sulfonate sites that attract metal cations resulting from dissolution of the metal alloy prior to the metal cations reaching the proton exchange membrane.

18 Claims, 2 Drawing Sheets

(51) Int. Cl.
  *H01M 8/1018* (2016.01)
  *H01M 4/90* (2006.01)
  *H01M 4/86* (2006.01)

(56) References Cited

U.S. PATENT DOCUMENTS

| | | | |
|---|---|---|---|
| 4,382,123 | A | 5/1983 | Kimoto et al. |
| 4,402,806 | A | 9/1983 | Coker et al. |
| 4,411,750 | A | 10/1983 | Silva et al. |
| 4,423,157 | A | 12/1983 | Masuda |
| 4,426,271 | A | 1/1984 | Yoshida et al. |
| 4,431,504 | A | 2/1984 | Seita et al. |
| 4,455,210 | A | 6/1984 | Coker et al. |
| 4,462,877 | A | 7/1984 | Ezzell |
| 4,490,484 | A | 12/1984 | Bissot et al. |
| 4,544,471 | A | 10/1985 | Silva et al. |
| 4,604,323 | A | 8/1986 | Johnson |
| 4,655,886 | A | 4/1987 | Oda et al. |
| 4,686,120 | A | 8/1987 | Johnson |
| 4,872,958 | A | 10/1989 | Suzuki et al. |
| 4,983,264 | A | 1/1991 | Miyake et al. |
| 5,654,109 | A | 8/1997 | Plowman et al. |
| 5,882,810 | A | 3/1999 | Mussell et al. |
| 5,981,097 | A | 11/1999 | Rajendran |
| 6,130,175 | A | 10/2000 | Rusch et al. |
| 6,156,451 | A | 12/2000 | Banerjee et al. |
| 6,436,566 | B1 | 8/2002 | Tange |
| 7,112,386 | B2 | 9/2006 | Cipollini et al. |
| 7,625,652 | B2 | 12/2009 | Uensal et al. |
| 8,057,847 | B2 | 11/2011 | Leistra et al. |
| 8,071,702 | B2 | 12/2011 | Wu et al. |
| 8,507,151 | B2 | 8/2013 | Budinski |
| 2004/0036394 | A1 | 2/2004 | Hamrock et al. |
| 2005/0221141 | A1* | 10/2005 | Hampden-Smith ...... B01J 21/18 524/544 |
| 2006/0110644 | A1 | 5/2006 | Fuller et al. |
| 2008/0020262 | A1* | 1/2008 | Zhang ................ H01M 4/8652 429/492 |
| 2008/0187815 | A1* | 8/2008 | Hiromitsu ........... H01M 4/8807 429/494 |
| 2010/0197490 | A1* | 8/2010 | Adzic .................... B82Y 30/00 502/326 |
| 2010/0323265 | A1 | 12/2010 | Tokuda |
| 2011/0027696 | A1 | 2/2011 | Fay |
| 2011/0086295 | A1* | 4/2011 | Lopez .................. H01M 4/921 429/524 |
| 2011/0171561 | A1* | 7/2011 | Pillai ....................... H01B 1/04 429/492 |
| 2015/0280245 | A1* | 10/2015 | Merzougui ......... H01M 4/9016 429/527 |
| 2016/0233519 | A1* | 8/2016 | Nagamori ............... H01M 4/88 |

FOREIGN PATENT DOCUMENTS

| | | |
|---|---|---|
| JP | H06231781 A | 8/1994 |
| JP | 19950135004 | 5/1995 |
| JP | H08171920 A | 7/1996 |
| JP | 2007157453 A | 6/2007 |
| WO | 1983001597 A1 | 5/1983 |
| WO | 1999027599 A1 | 6/1999 |

* cited by examiner

FUNCTIONALIZED CARBON LAYER FOR MEMBRANE DEGRADATION MITIGATION UNDER FUEL CELL OPERATING CONDITIONS

TECHNICAL FIELD

This disclosure relates to fuel cells having a functionalized carbon layer to mitigate membrane degradation in fuel cells utilizing transition metal alloys in the catalyst.

BACKGROUND

Fuel cells efficiently and electrochemically convert fuel into electric current, which may then be used to power electric circuits, such as drive systems for vehicles. A fuel cell containing a proton exchange membrane is an electrochemical device that converts chemical energy to electrical energy using, for example, hydrogen or methane as fuel and oxygen/air as oxidant. A typical fuel cell membrane electrode assembly includes a solid polymer electrolyte proton conducting membrane between two electrodes.

Catalysts are used to enhance the rate of the electrochemical reactions which occur at the electrodes. Catalysts typically include noble metals such as platinum carried by a support particle. Platinum-transition metal alloys are used as electrocatalysts in proton exchange membrane fuel cells due to their remarkable activities for oxygen reduction reaction and hydrogen oxidation reaction. These catalysts are typically carried by a support particle. However, issues, such as significant voltage drops, have been observed.

SUMMARY

Disclosed herein are membrane electrode assemblies and fuel cells having a sacrificial intercalating agent to mitigate membrane degradation in fuel cells utilizing metal alloys in the catalyst.

One embodiment of a fuel cell comprises a proton exchange membrane having an anode side and a cathode side. An anode catalyst layer is on the anode side of the proton exchange membrane and a cathode catalyst layer is on the cathode side of the proton exchange membrane. Each of the anode catalyst layer and the cathode catalyst layer comprises a metal alloy. A gas diffusion layer is on each of the anode catalyst layer and the cathode catalyst layer opposite the proton exchange membrane. A sacrificial intercalating agent is between the proton exchange membrane and one of the anode catalyst layer and the cathode catalyst layer, the sacrificial intercalating agent having sulfonate sites that attract metal cations resulting from dissolution of the metal alloy prior to the metal cations reaching the proton exchange membrane.

An embodiment of a membrane electrode assembly comprises a proton exchange membrane having an anode side and a cathode side. A catalyst layer is on each of the anode side and the cathode side of the proton exchange membrane, each catalyst layer comprising a metal alloy. A sulfonic acid functionalized carbon layer is between the proton exchange membrane and the catalyst layer on one of the anode side and the cathode side.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Disclosed herein are membrane assemblies and fuel cells having a functionalized carbon layer to mitigate membrane degradation in fuel cells utilizing metal alloys in the catalyst.

Figure 1:
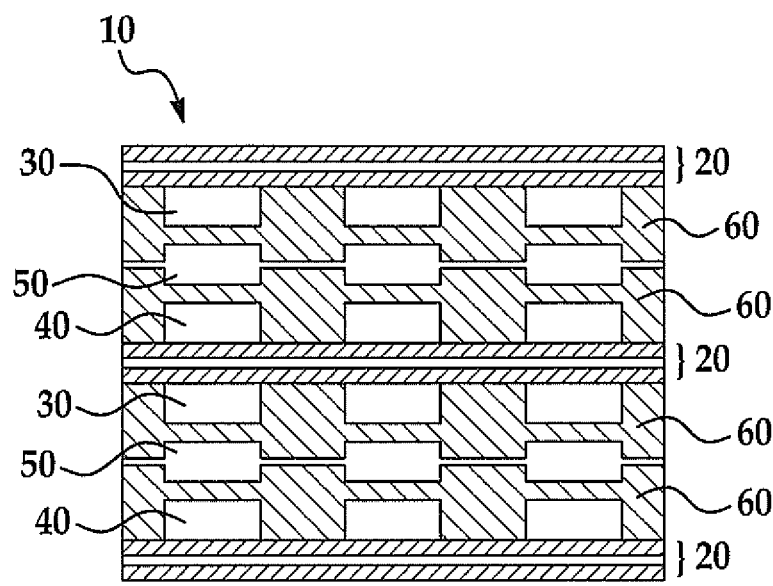
FIG. 1 is a schematic cross-sectional illustration of a portion of a fuel cell stack.

Proton exchange membrane fuel cells are electrochemical devices converting chemical energy to electrical energy by using hydrogen as a fuel and oxygen/air as an oxidant. The proton exchange membrane fuel cell has a fuel cell membrane electrode assembly generally comprising five layers, including a solid polymer electrolyte proton conducting membrane, two gas diffusion layers, and two catalyst layers. FIG. 1 shows a schematic cross-sectional illustration of a portion of a fuel cell stack 10. The illustration is provided as an example of the use of a membrane assembly in fuel cells and is not meant to be limiting.

The fuel cell stack 10 is comprised of multiple membrane electrode assemblies 20. Fuel 30 such as hydrogen is fed to the anode side of a membrane electrode assembly 20, while an oxidant 40 such as oxygen or air is fed to the cathode side of the membrane electrode assembly 20. Coolant 50 is supplied between the fuel 30 and oxidant 40, the coolant 50 separated from the fuel 30 and oxidant 40 by separators 60.

Figure 2:
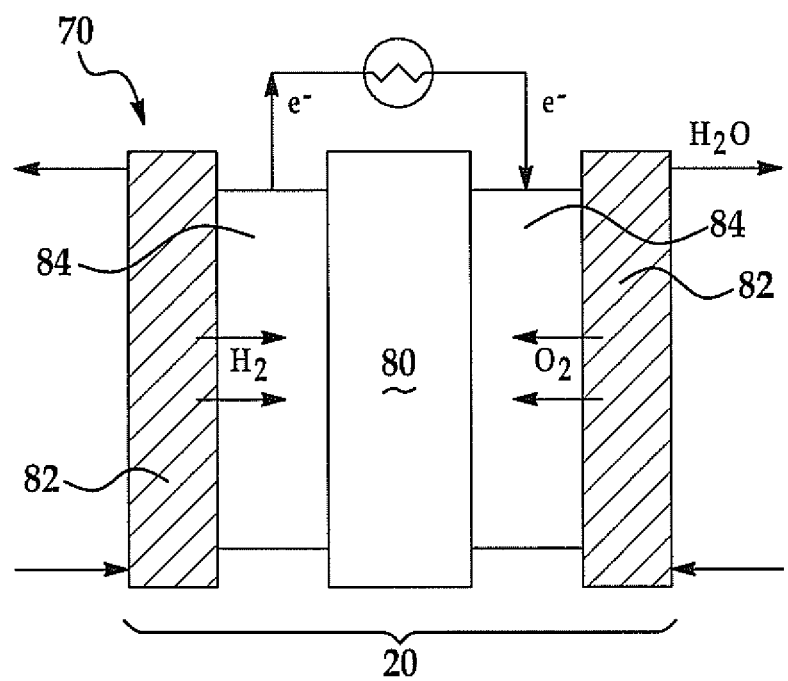
FIG. 2 illustrates a conventional fuel cell.

FIG. 2 is an illustration of a conventional fuel cell 70 forming the fuel cell stack 10. The fuel cell 70 is comprised of a single membrane electrode assembly 20. The membrane electrode assembly 20 has a membrane 80 with a gas diffusion layer 82 on opposing sides of the membrane 80. Between the membrane 80 and each gas diffusion layer 82 is a catalyst layer 84. The catalyst layer 84 can be formed on the membrane 80. Alternatively, a gas diffusion electrode is made by forming a catalyst layer 84 on a surface of each gas diffusion layer 82 and sandwiching the membrane 80 between the gas diffusion layers 82 such that the catalyst layers 84 contact the membrane 80. When fuel 30, such as hydrogen gas, is introduced into the fuel cell 70, the catalyst layer 84 at the anode splits hydrogen gas molecules into protons and electrons. The protons pass through the membrane 80 to react with the oxidant 40, such as air, forming water ($H_2O$). The electrons ($e^-$), which cannot pass through the membrane 80, must travel around it, thus creating the source of electrical energy.

Proton exchange membrane fuel cells are being developed with a catalyst having an active catalyst particle, such as platinum, supported on or alloyed with a metal, such as transition metals. Examples of these metals include, but are not limited to, nickel, cobalt, iron, and copper.

The proton exchange membranes are typically made of perfluorosulfonic acid. Under fuel cell operating conditions, significant voltage drops over time are commonly observed due to the dissolution of metals such as Fe, Cu, Ni and Co. These metals were observed to migrate into the ionomer, creating fuel cell performance loss. Most metal cations have a higher affinity for the sulfonate sites (—SO3H) of the proton exchange membrane than the proton. The higher the valence of the cation of the transition metals, the stronger the affinity to the sulfonate sites. This leads to weaker mobility of the metal cation, further leading to accumulation of the metal cations in the proton exchange membrane. This metal cation contamination leads to the reduction of proton exchange membrane conductivity, water content and proton transference numbers.

To increase the durability of the proton exchange membrane over the lifespan of the fuel cell, a sacrificial intercalating agent is positioned between the proton exchange membrane and the catalyst layer. The sacrificial intercalating agent has sulfonate sites that attract metal cations resulting from dissolution of the metal alloy prior to the metal cations reaching the proton exchange membrane. The sulfonate sites of the sacrificial intercalating agent serve as the intercalating agent instead of the sulfonate sites of the proton exchange membrane.

Figure 3:
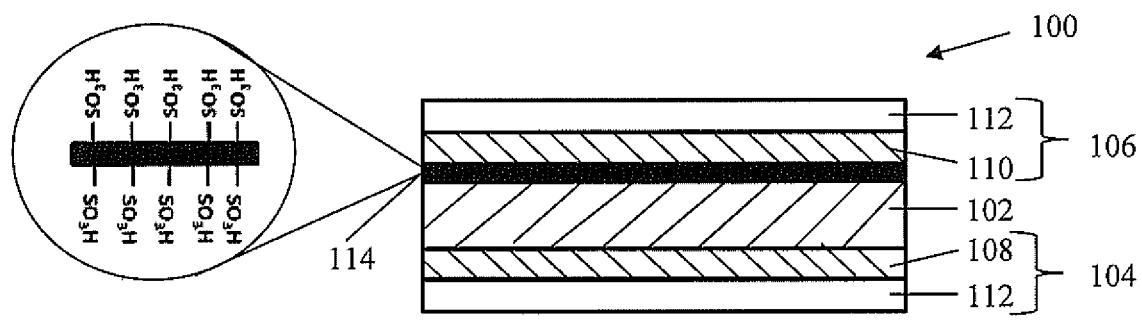
FIG. 3 is a cross-sectional view of an embodiment of a membrane electrode assembly as disclosed herein.

FIG. 3 illustrates a membrane electrode assembly 100 having a proton exchange membrane 102 having an anode side 104 and a cathode side 106. An anode catalyst layer 108 is located on the anode side 104 and a cathode catalyst layer 110 is located on the cathode side 106 of the proton exchange membrane 102. The catalyst layers 108, 110 comprise one or more metal alloys, including one or more noble metals. Non-limiting examples of the metals include transition metals such as nickel, cobalt, copper and iron. Non-limiting examples of the noble metal include platinum, ruthenium, rhodium, palladium, silver, iridium and gold. A gas diffusion layer 112 is located on a respective catalyst layer 108, 110 opposite the proton exchange membrane 102.

Figure 4:
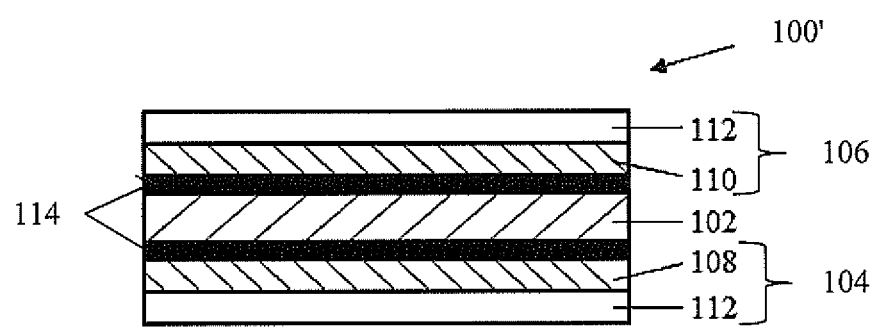
FIG. 4 is a cross-sectional view of another embodiment of a membrane electrode assembly as disclosed herein.

A sacrificial intercalating agent 114 is positioned between the proton exchange membrane 102 and the cathode catalyst layer 110 in FIG. 3. However, the sacrificial intercalating agent 114 can alternatively be located between the proton exchange membrane 102 and the anode catalyst layer 108. As shown in the membrane electrode assembly 100' of FIG. 4, it is also contemplated that there be a sacrificial intercalating agent 114 between the proton exchange membrane 102 and each of the anode catalyst layer 108 and the cathode catalyst layer 110. The sacrificial intercalating agent 112 has sulfonate sites (—SO3H) that attract metal cations, such as $Fe^{2+}$, $Ni^{3+}$, resulting from dissolution of the metal alloy prior to the metal cations reaching the proton exchange membrane 102.

The sacrificial intercalating agent 114 is a sulfonic acid functionalized carbon layer. As illustrated in the exploded portion of FIG. 3, the sulfonic acid functionalized carbon layer has sulfonate sites accessible to the metal cations which can be sacrificed to extend the life of the proton exchange membrane 102. The carbon of the sulfonic acid functionalized carbon layer can be carbon nanotubes, graphene, or other high surface area carbon. Other carbons can be used as well, with different means of functionalization used for the lower surface area carbons. Such methods are known to those skilled in the art.

The carbon is functionalized with sulfonic acid by means known to those skilled in the art. For instance, a known concentration or amount of sulfonic acid functional group precursor is added with the known concentration or amount of the carbon support. The precursor to carbon ratio can be varied according to the desired acid site density. The acid site densities of the carbon support are determined by elemental analysis and acid-base back-titration. The amount of sulfonic acid functionalized on the carbon support is characterized by methods known in the field. One such method is the determination of ion-exchange capacity by typical acid-base titration. Elemental analysis determining the sulfur content can be performed to determine the weight percent of sulfur present in the carbon support.

The sacrificial intercalating agent 114 has a thickness between about 0.5 µm to about 3 µm, while the proton exchange membrane 102 has a thickness of less than 25 µm and the catalyst layers 108, 110 have a thickness between about 5 µm and 10 µm.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be afforded the broadest interpretation so as to encompass all such modifications and equivalent structures as is permitted under the law.

What is claimed is:

1. A membrane electrode assembly comprising:
   a proton exchange membrane having an anode side and a cathode side;
   a catalyst layer on each of the anode side and the cathode side of the proton exchange membrane, each catalyst layer comprising non-carbon catalyst particles comprising a noble metal supported on a non-carbon transition metal support, each catalyst layer having no carbon; and
   a sulfonic acid functionalized carbon layer consisting essentially of sulfonic acid chemically bound to carbon, the sulfonic acid functionalized carbon layer provided between the proton exchange membrane and the catalyst layer on one of the anode side and the cathode side.

2. The membrane electrode assembly of claim 1, wherein the sulfonic acid functionalized carbon layer is between the proton exchange membrane and the catalyst layer on the cathode side.

3. The membrane electrode assembly of claim 1, further comprising another sulfonic acid functionalized carbon layer between the proton exchange membrane and the catalyst layer on the other of the anode side and the cathode side.

4. The membrane electrode assembly of claim 1, wherein the sulfonic acid functionalized carbon layer comprises sulfonic acid functionalized carbon nanotubes.

5. The membrane electrode assembly of claim 1, wherein the sulfonic acid functionalized carbon layer comprises sulfonic acid functionalized graphene.

6. The membrane electrode assembly of claim 1, wherein the transition metal support comprises one or more of nickel, iron, cobalt and copper.

7. The membrane electrode assembly of claim 6, wherein the noble metal comprises platinum.

8. The membrane electrode assembly of claim 1, wherein the sulfonic acid functionalized carbon layer has a thickness between about 0.5 µm to about 3 µm.

9. The membrane electrode assembly of claim 1, further comprising a gas diffusion layer on a respective catalyst layer opposite the proton exchange membrane.

10. A fuel cell comprising:
    a proton exchange membrane having an anode side and a cathode side;
    an anode catalyst layer on the anode side of the proton exchange membrane and a cathode catalyst layer on the cathode side of the proton exchange membrane, each of the anode catalyst layer and the cathode catalyst layer having no carbon and comprising a non-carbon catalyst including a metal alloy;

a gas diffusion layer on each of the anode catalyst layer and the cathode catalyst layer opposite the proton exchange membrane; and a layer consisting of a sacrificial intercalating agent between the proton exchange membrane and one of the anode catalyst layer and the cathode catalyst layer, the sacrificial intercalating agent having sulfonate sites chemically attached to a carbon substrate that attract metal cations resulting from dissolution of the metal alloy prior to the metal cations reaching the proton exchange membrane.

11. The fuel cell of claim 10, wherein the sacrificial intercalating agent is between the proton exchange membrane and the cathode catalyst layer.

12. The fuel cell of claim 11, further comprising another sacrificial intercalating agent between the proton exchange membrane and the anode catalyst layer.

13. The fuel cell of claim 10, wherein the sacrificial intercalating agent is a sulfonic acid functionalized carbon layer.

14. The fuel cell of claim 13, wherein the sulfonic acid functionalized carbon layer comprises sulfonic acid functionalized carbon nanotubes.

15. The fuel cell of claim 13, wherein the sulfonic acid functionalized carbon layer comprises sulfonic acid functionalized graphene.

16. The fuel cell of claim 10, wherein the metal alloy comprises one or more of nickel, iron, cobalt and copper.

17. The fuel cell of claim 16, wherein the metal alloy further comprises platinum.

18. The fuel cell of claim 10, wherein the sacrificial intercalating agent has a thickness between about 0.5 μm to about 3 μm.

* * * * *